No. 712,336.  
S. RUDNER.  
FILTERING FUNNEL.  
(Application filed Nov. 18, 1901.)  
Patented Oct. 28, 1902.

(No Model.)

WITNESSES:
Gustav Dieterich
John Lotka

INVENTOR
Samuel Rudner
BY Briesen & Knauth
ATTORNEYS

UNITED STATES PATENT OFFICE.

SAMUEL RUDNER, OF NEW YORK, N. Y., ASSIGNOR, BY MESNE ASSIGNMENTS, TO HIMSELF AND SAMUEL A. SANCIER, COPARTNERS TRADING AS THE AMERICAN FILTERING FUNNEL COMPANY, OF NEW YORK, N. Y.

FILTERING-FUNNEL.

SPECIFICATION forming part of Letters Patent No. 712,336, dated October 28, 1902.

Application filed November 18, 1901. Serial No. 82,696. (No model.)

*To all whom it may concern:*

Be it known that I, SAMUEL RUDNER, a subject of the Emperor of Austria-Hungary, residing in the city of New York, borough of Manhattan, State of New York, have invented certain new and useful Improvements in Filtering-Funnels, of which the following is a specification.

My invention relates to filtering-funnels, and has for its object to provide a simple and highly efficient construction for filtering and straining liquids.

Reference is to be had to the accompanying drawings, in which—

Figure 1:
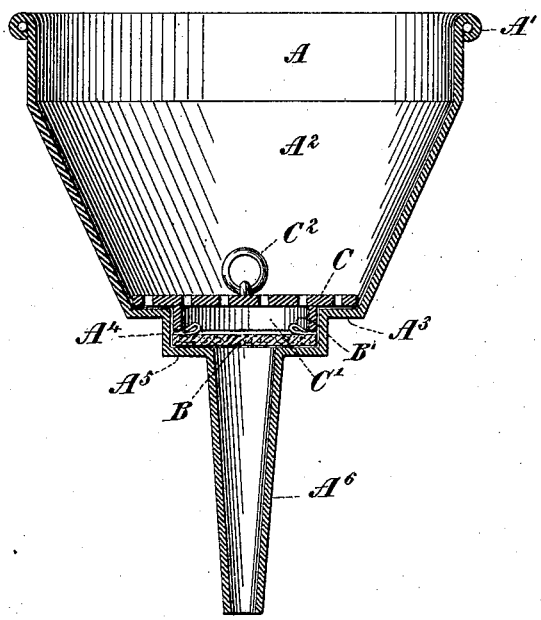
Figure 2:
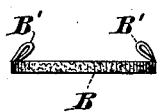
Figure 3:
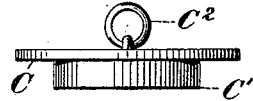

Figure 1 is a sectional elevation of a funnel embodying my invention. Fig. 2 is a separate view of the filter proper, and Fig. 3 is a like view of the sieve or strainer.

My improved filtering-funnel comprises a funnel proper a filter, and a sieve or strainer arranged in a particularly novel manner, as clearly defined in the appended claim. I desire it to be understood that the construction shown in the accompanying drawings and described hereinafter is only an example of the many forms in which my invention may be carried out.

As shown, the funnel proper has a substantially cylindrical upper portion or mouth A with a beaded edge A', and below this cylindrical portion is located a tapered or conical portion $A^2$, the two portions A and $A^2$ forming a receptacle for the liquid to be strained and filtered. At the lower end of the tapered portion $A^2$ the funnel is provided with a horizontal seat or shoulder $A^3$, and below this is arranged a cylindrical portion $A^4$, adapted to contain the filter. This chamber at its bottom is provided with a ring-shaped seat or shoulder $A^5$, from which projects downwardly the tapered spout or outlet $A^6$ of the funnel. It will be observed that the two ring-shaped seats $A^3$ and $A^5$ are not only located at different levels, but the upper seat $A^3$ is of greater diameter than the lower seat $A^5$. Upon this lower seat is adapted to rest the filter B, which may be simply a disk of felt or like material, the diameter of this disk being substantially equal to the inner diameter of the chamber $A^4$. To facilitate the insertion and the removal of this filter, I secure to it, preferably at diametrically opposite points, handles B', which may be made of cord, tape, leather, or the like. Upon the upper seat $A^3$ rests the sieve or strainer C, which is provided with a downwardly-extending circular flange C', which projects into the chamber $A^4$ and is adapted to hold the filter B upon its seat. This flange may also be used as a means for centering the strainer C, although this result is also obtained by the engagement of the strainer edge with the bottom portion of the inclined wall $A^2$. To allow the sieve to be readily manipulated, I provide a centrally-attached ring $C^2$, forming a handle.

In assembling the article the filter B is first put on the shoulder $A^5$. Then the strainer C is inserted, the flange C' holding the filter down upon its seat, and thus preventing any flow of liquid around the filter. At the same time as the sieve C rests on the seat $A^3$ the flange C' will be prevented from cutting or crushing the filter. The upper portion A $A^2$ of the funnel provides a receptacle of comparatively large capacity for the liquid to be filtered. The entire device is readily and quickly assembled and taken apart, and the filter may be renewed promptly when necessary.

Having described my invention, what I claim, and desire to secure by Letters Patent, is—

The combination of a funnel having two seats or shoulders of different levels, with a filter provided with a handle and located upon the lower seat, and a sieve or strainer resting upon the upper seat and likewise provided with a handle, the sieve and filter being separate from each other so that they may be moved independently.

SAMUEL RUDNER.

Witnesses:
JOHN LOTKA,
OTTO V. SCHRENK.